US009212727B1

(12) United States Patent
Kesterson et al.

(10) Patent No.: US 9,212,727 B1
(45) Date of Patent: Dec. 15, 2015

(54) APPARATUS HAVING SELECTABLE ANGULAR ORIENTATIONS RELATIVE TO A DRIVE

(71) Applicant: The Boeing Company, Chicago, IL (US)

(72) Inventors: Matthew Gregory Kesterson, Everett, WA (US); Roger A. Gage, Marysville, WA (US)

(73) Assignee: The Boeing Company, Chicago, IL (US)

( * ) Notice: Subject to any disclaimer, the term of this patent is extended or adjusted under 35 U.S.C. 154(b) by 283 days.

(21) Appl. No.: 13/970,780

(22) Filed: Aug. 20, 2013

(51) Int. Cl.
*F16H 3/20* (2006.01)
*B25G 1/06* (2006.01)
*B25B 21/00* (2006.01)

(52) U.S. Cl.
CPC ................ *F16H 3/20* (2013.01); *B25B 21/002* (2013.01); *B25G 1/063* (2013.01)

(58) Field of Classification Search
CPC .......... F16H 3/20; B25G 1/063; B25B 17/00; B25B 21/002; B25B 13/461
USPC .................................. 81/57.13, 57.26, 177.8
See application file for complete search history.

(56) References Cited

U.S. PATENT DOCUMENTS

| | | | | |
|---|---|---|---|---|
| 291,972 | A * | 1/1884 | Atwood | 81/177.8 |
| 928,375 | A * | 7/1909 | Frick | 81/177.8 |
| 1,417,338 | A * | 5/1922 | Lenahan | 81/177.8 |
| 3,987,692 | A | 10/1976 | Lesner et al. | |
| 4,287,795 | A * | 9/1981 | Curtiss | 81/57.26 |
| 5,522,286 | A * | 6/1996 | Wilson et al. | 81/57.26 |
| 6,796,385 | B1 * | 9/2004 | Cobzaru et al. | 173/1 |
| 7,047,849 | B2 * | 5/2006 | Lai | 81/479 |
| 8,640,780 | B2 * | 2/2014 | Francis et al. | 81/57.22 |

* cited by examiner

*Primary Examiner* — Hadi Shakeri
(74) *Attorney, Agent, or Firm* — Smith Moore Leatherwood LLP; Thomas W. Epting

(57) ABSTRACT

In one aspect of the disclosure, an apparatus for being coupled to a drive to rotate a first portion of an article relative to a second portion thereof is provided. A chassis includes a first slot and an engagement feature. An input is rotatably mounted to the chassis, and an annular output is rotatably mounted to the chassis and is rotatably coupled to the input. A collar, which includes a plurality of mating features complementary with the engagement feature, is configured to engage the drive. The annular output includes a wall and a second slot extending entirely through the full thickness and height of the wall.

20 Claims, 8 Drawing Sheets

APPARATUS HAVING SELECTABLE ANGULAR ORIENTATIONS RELATIVE TO A DRIVE

BACKGROUND OF THE INVENTION

Devices, such as rotary drives, may have limited access to an element to be rotated, such as a nut. A rotary drive may, for example, be out of position to engage the element to be rotated due to interfering objects.

SUMMARY

Accordingly, an apparatus for attachment to a rotary drive and having selectable angular orientations relative thereto may find utility.

One example of the present disclosure relates to an apparatus to be operatively coupled to a drive. The apparatus includes a chassis including a first slot and an engagement feature. The apparatus also includes an input rotatably mounted to the chassis, an annular output rotatably mounted to the chassis and rotatably coupled to the input, and a collar configured to engage the drive. The annular output includes a wall and a second slot extending radially and longitudinally entirely through the wall. The collar includes a plurality of mating features complementary with the engagement feature.

In one example, which may include at least a portion of the subject matter of any of the preceding and/or following examples, the apparatus includes a first coupling, arranged to transmit a first torque from the input to the annular output, and a second coupling, arranged to transmit a second torque from the input to the annular output, the second coupling being arranged in parallel with the first coupling.

In one example of the apparatus, which may include at least a portion of the subject matter of any of the preceding and/or following examples, with the annular output not coupled to the input by the first coupling, the annular output is coupled to the input by the second coupling. Conversely, with the annular output not coupled to the input by the second coupling, the annular output is coupled to the input by the first coupling.

In one example of the apparatus, which may include at least a portion of the subject matter of any of the preceding and/or following examples, the first coupling and the second coupling transmit a total torque to the annular output from the input, the total torque being equal to a sum of the first torque and the second torque.

In one example of the apparatus, which may include at least a portion of the subject matter of any of the preceding and/or following examples, the second torque equals the total torque when the first torque is zero, and the first torque equals the total torque when the second torque is zero.

In one example of the apparatus, which may include at least a portion of the subject matter of any of the preceding and/or following examples, the first coupling engages the annular output at a first angular position on the annular output, and the second coupling engages the annular output at a second angular position on the annular output.

In one example of the apparatus, which may include at least a portion of the subject matter of any of the preceding and/or following examples, the first angular position and the second angular position subtend a central angle greater than that subtended by the second slot. The central angle includes an apex coincident with a rotational axis of the annular output.

In one example of the apparatus, which may include at least a portion of the subject matter of any of the preceding and/or following examples, the input further includes an input gear and the annular output further includes an output gear, the second slot extending radially and longitudinally entirely through the output gear.

In one example of the apparatus, which may include at least a portion of the subject matter of any of the preceding and/or following examples, the first coupling includes a first intermediate gear, the second coupling includes a second intermediate gear, and the input gear is in mesh with the first intermediate gear and the second intermediate gear.

In one example of the apparatus, which may include at least a portion of the subject matter of any of the preceding and/or following examples, wherein, with the output gear not in mesh with the first intermediate gear, the output gear is in mesh with the second intermediate gear, and with the output gear not in mesh with the second intermediate gear, the output gear is in mesh with the first intermediate gear.

In one example of the apparatus, which may include at least a portion of the subject matter of any of the preceding and/or following examples, the apparatus also includes a drive rotatably coupled to the input.

In one example of the apparatus, which may include at least a portion of the subject matter of any of the preceding and/or following examples, the mating features are discrete.

In one example of the apparatus, which may include at least a portion of the subject matter of any of the preceding and/or following examples, the collar is configured to be infinitely angularly adjustable relative to the drive.

In one example of the apparatus, which may include at least a portion of the subject matter of any of the preceding and/or following examples, the collar comprises a clamp.

In one example of the apparatus, which may include at least a portion of the subject matter of any of the preceding and/or following examples, the engagement feature is male and the mating features are female.

In one example of the apparatus, which may include at least a portion of the subject matter of any of the preceding and/or following examples, the collar has an outer surface and the mating features are located along the outer surface.

In one example of the apparatus, which may include at least a portion of the subject matter of any of the preceding and/or following examples, the mating features provide discrete selectable angular orientations of the chassis relative to the drive.

In one example, which may include at least a portion of the subject matter of any of the preceding and/or following examples, the apparatus also includes a counter to register rotations of the annular output.

In one example of the apparatus, which may include at least a portion of the subject matter of any of the preceding and/or following examples, the counter is a mechanical counter.

In one example of the apparatus, which may include at least a portion of the subject matter of any of the preceding and/or following examples, the counter is mechanically coupled to one of the input or the annular output.

In one example of the apparatus, which may include at least a portion of the subject matter of any of the preceding and/or following examples, one of the input or the annular output further comprises a lobe. The counter further includes an input element movable between a first position and a second position, and the apparatus further includes a linkage to be displaced by the lobe and to move the input element between the first position and the second position.

In one example of the apparatus, which may include at least a portion of the subject matter of any of the preceding and/or following examples, the counter includes a return spring to urge the input element to the first position.

One example of the present disclosure relates to a method of rotating a first portion of an article relative to a second portion thereof. The second portion is coaxial with the first portion. The first portion has a diameter exceeding that of the second portion. The method includes providing a chassis that includes a first slot, an input rotatably mounted to the chassis, and an annular output rotatably mounted to the chassis. The annular output includes a wall and a second slot extending radially and longitudinally entirely through the wall. The method also includes coupling the chassis to a drive in a selectable angular orientation of the chassis relative to the drive, aligning the first slot and the second slot, passing the second portion of the article through the first slot and the second slot to axially align the annular output with the article, coupling the annular output with the first portion of the article, and rotating the annular output to rotate the first portion of the article with respect to the chassis.

In one example, which may include at least a portion of the subject matter of any of the preceding and/or following examples, the method also includes applying a torque to an input rotatably mounted to the chassis and rotatably coupled to the annular output.

In one example, which may include at least a portion of the subject matter of any of the preceding and/or following examples, the method also includes registering rotations of the annular output.

In one example of the method, which may include at least a portion of the subject matter of any of the preceding and/or following examples, registering rotations of the annular output includes registering and/or summing rotations of one of the input or the annular output.

In one example, which may include at least a portion of the subject matter of any of the preceding and/or following examples, the method includes applying a torque to the input rotatably coupled to the annular output.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

FIG. 1 is a flow diagram of aircraft production and service methodology;

FIG. 2 is a block diagram of an aircraft;

FIG. 3 is a block diagram of an apparatus, according to an aspect of the present disclosure;

FIG. 4 is an exploded perspective view of an apparatus according to an aspect of the present disclosure;

FIG. 5 is a perspective detail view of an internal mechanism of the apparatus illustrated in FIG. 4, according to one aspect of the disclosure;

FIG. 6 is a schematic view of the internal mechanism of FIG. 5;

FIG. 7 is a schematic view of the apparatus of FIG. 4, showing alternative configurations thereof;

FIG. 8 is a perspective view illustrating an optional feature according to one aspect of the disclosure;

FIG. 9 is a partial perspective detail view of the feature of FIG. 8; and FIG. 10 is a perspective view of a variant of the feature of FIG. 8.

DETAILED DESCRIPTION

Figure 1:
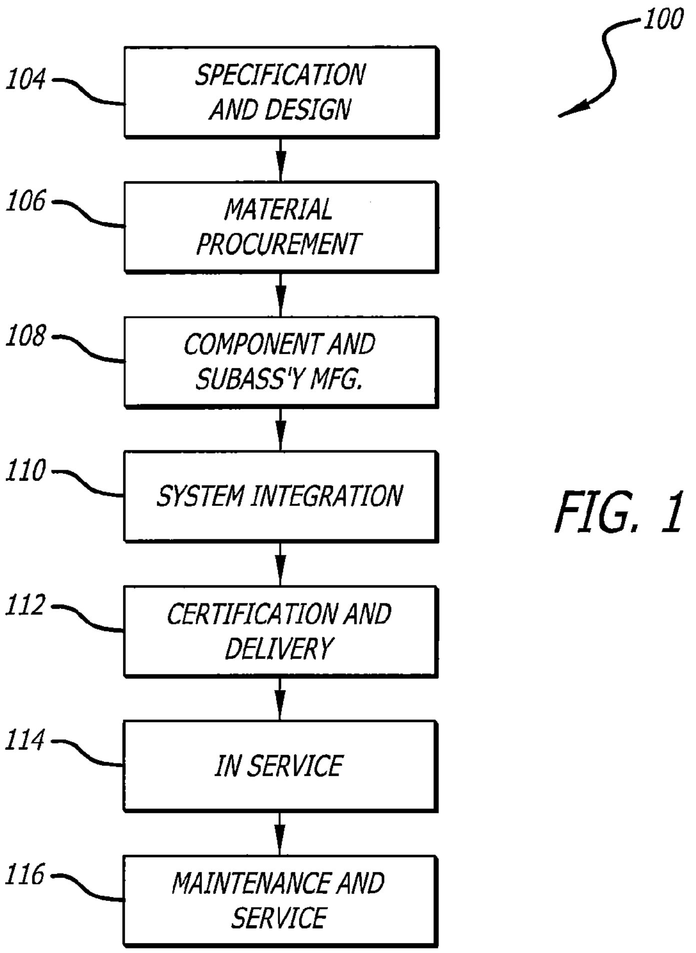
Figure 2:
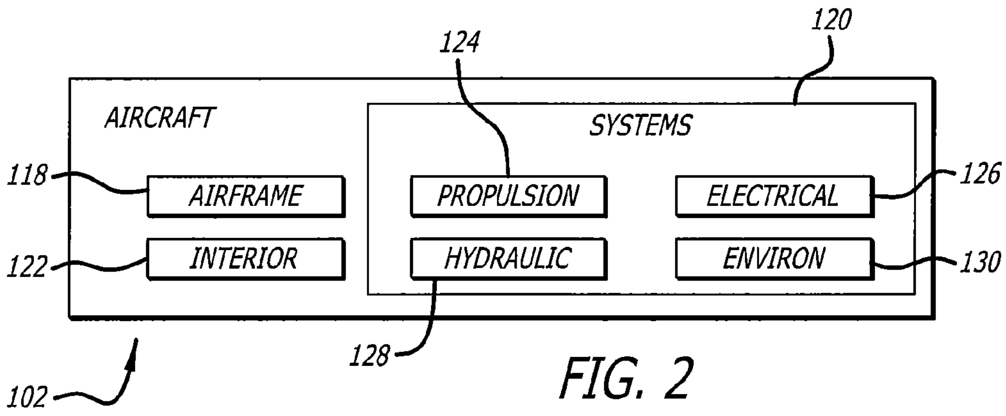

Examples of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft take place. Thereafter, the aircraft 102 may go through certification and delivery 112 to be placed in service 114. While in service by a customer, the aircraft 102 is scheduled for routine maintenance and service 116 (which may also include modification, reconfiguration, refurbishment, and so on).

Each of the processes of the illustrative method 100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 2, the aircraft 102 produced by the illustrative method 100 may include an airframe 118 with a plurality of high-level systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods shown or described herein may be employed during any one or more of the stages of the manufacturing and service method 100. For example, components or subassemblies corresponding to component and subassembly manufacturing 108 may be fabricated or manufactured in a manner similar to components or subassemblies produced while the aircraft 102 is in service. Also, one or more aspects of the apparatus, method, or combination thereof may be utilized during the production states 108 and 110, for example, by substantially expediting assembly of or reducing the cost of an aircraft 102. Similarly, one or more of apparatus or method realizations, or a combination thereof, may be utilized, for example and without limitation, while the aircraft 102 is in service, e.g., maintenance and service 116.

Figure 3:
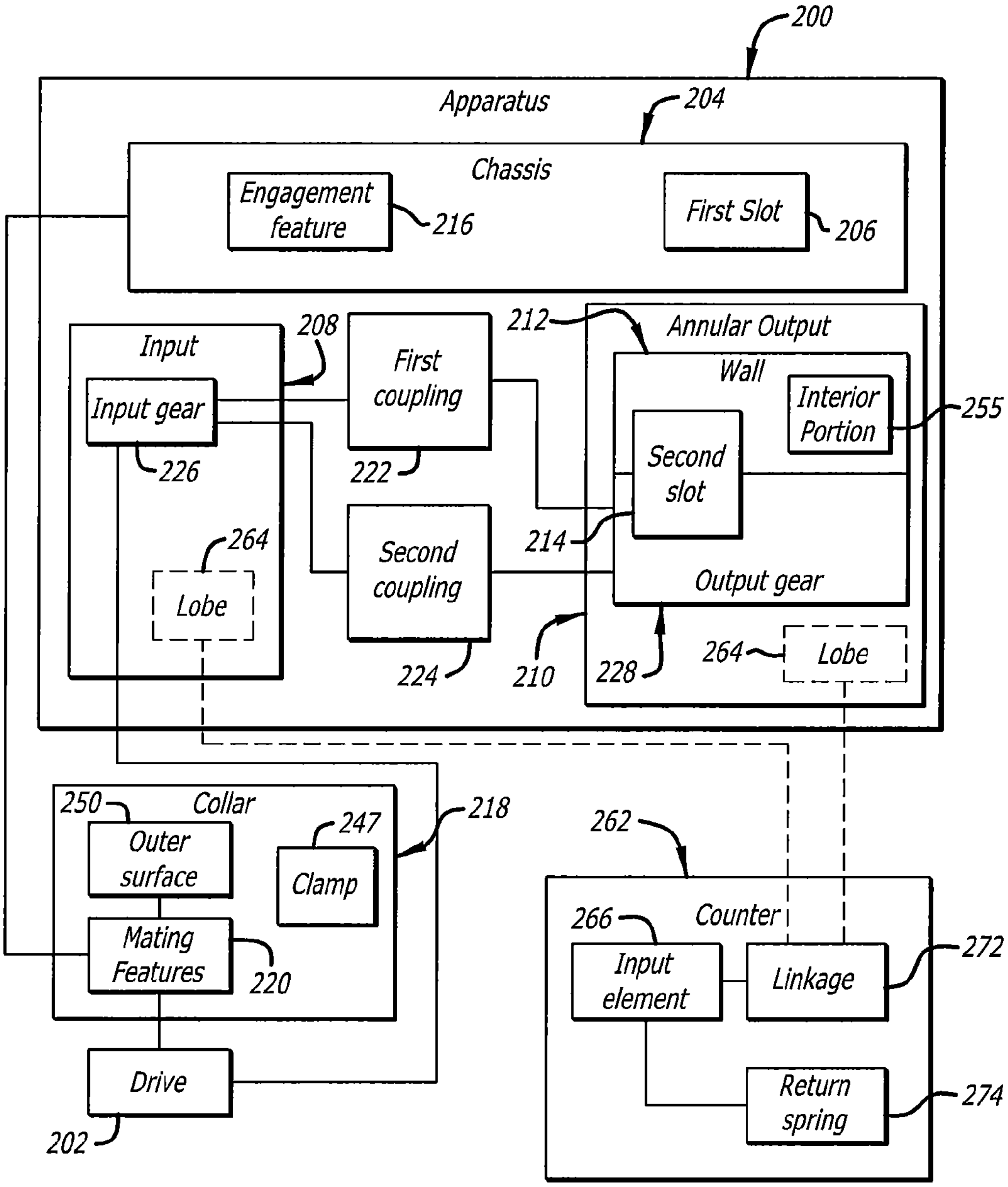
Figure 4:
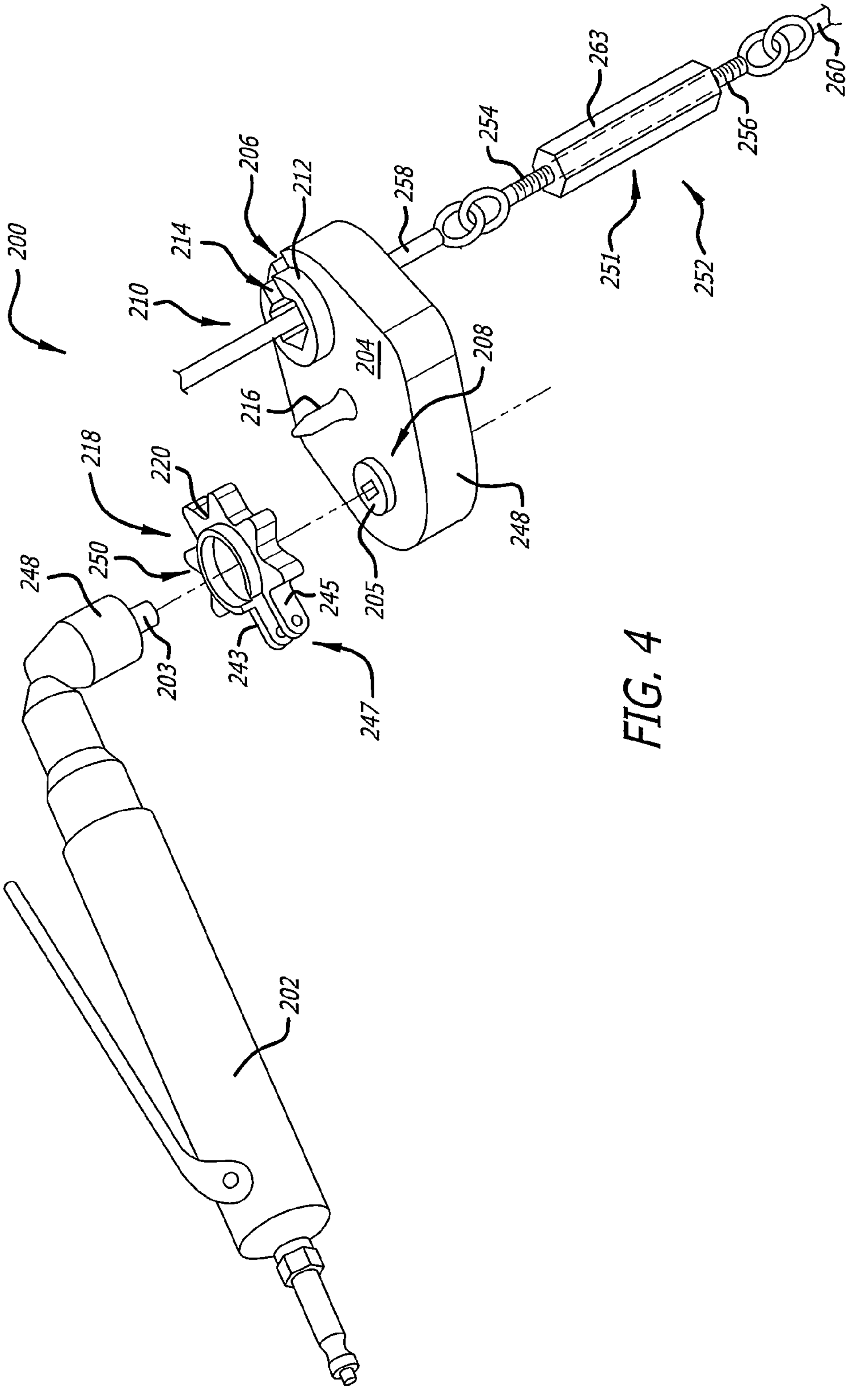

As illustrated in FIGS. 3 and 4, one example of the disclosure relates to an apparatus 200 to be operatively coupled to a drive 202. The drive 202 may be, for example, a conventional pneumatic or electric rotary drive. The apparatus 200 includes a chassis 204 including a first slot 206 and an engagement feature 216. The apparatus also includes an input 208 rotatably mounted to the chassis 204, an annular output 210 rotatably mounted to the chassis 204 and rotatably coupled to the input 208, and a collar 218 configured to engage the drive 202. The annular output 210 includes a wall 212 and a second slot 214 extending radially and longitudinally entirely through the wall 212, i.e., the second slot 214 extends entirely through the full thickness and height of the wall 212. The collar 218 includes a plurality of mating features 220 complementary with the engagement feature 216.

In FIG. 3, lines connecting various elements and/or components of the apparatus 200 may represent mechanical and other couplings and/or combinations thereof. Couplings other than those depicted in FIG. 3 may also exist. Dashed lines connecting the various elements and/or components of the apparatus 200 may represent couplings similar in function and purpose to those represented by solid lines; however, couplings represented by the dashed lines relate to alternative or optional aspects of the disclosure. Likewise, elements and/ or components of the apparatus 200 represented in dashed lines represent alternative or optional aspects of the disclosure.

Referring, for example, to FIG. 3, the apparatus 200 includes a first coupling 222 arranged to transmit a first torque from the input 208 to the annular output 210, and a second coupling 224 arranged to transmit a second torque from the input 208 to the annular output 210. The second coupling 224 is in parallel with the first coupling 222. Redundant first and second couplings 222, 224 promote uninterrupted torque transmission, as will be further described hereinafter.

Figure 5:
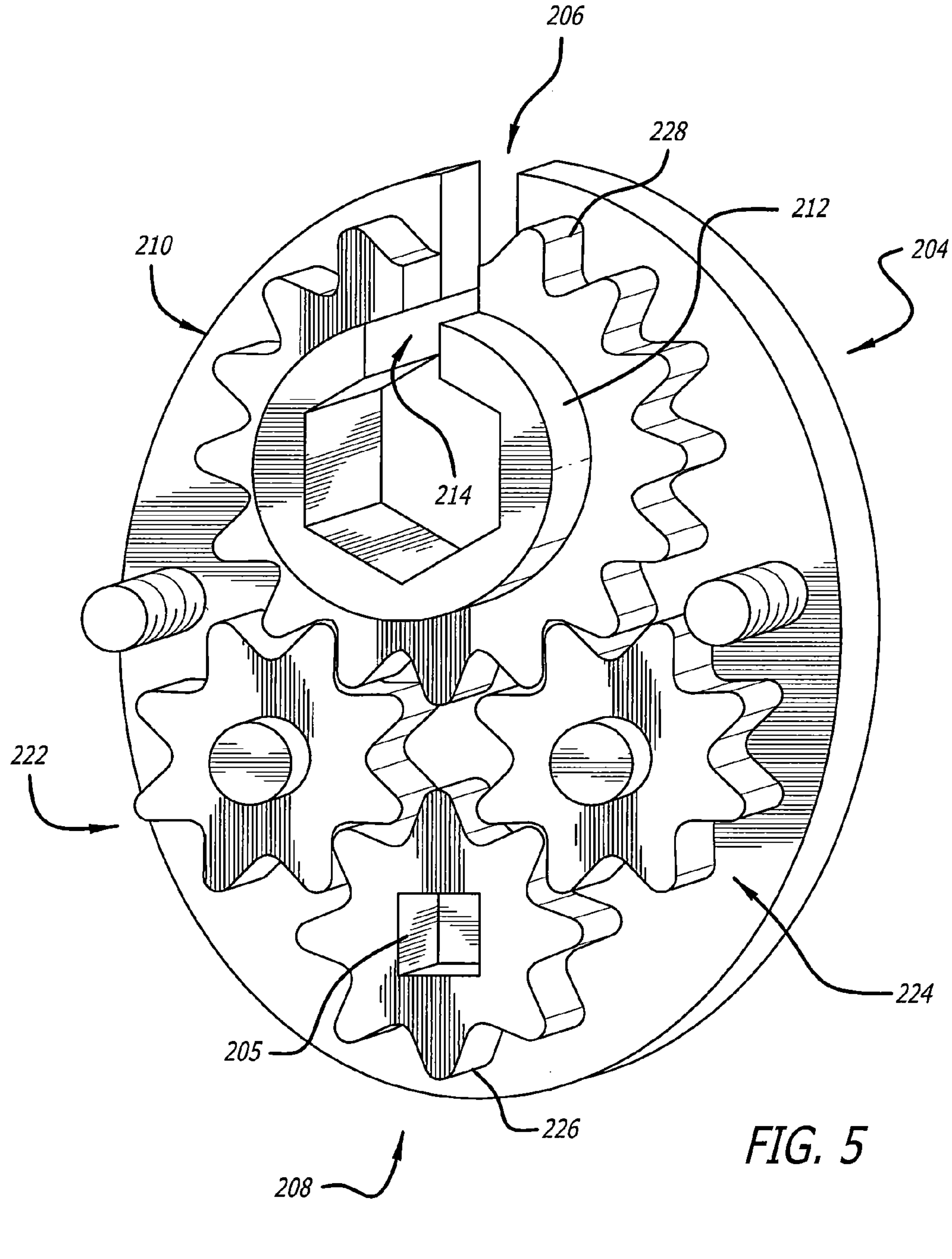

Referring to FIG. 5, in one example, the input 208 includes an input gear 226, and the annular output 210 includes an output gear 228. The second slot 214 extends radially and longitudinally entirely through the output gear 228. The first coupling 222, schematically illustrated in FIG. 3, may be a first intermediate gear 222. The second coupling 224, schematically illustrated in FIG. 3, may be a second intermediate gear 224. The input gear 226 is in mesh with the first intermediate gear 222 and the second intermediate gear 224.

Figure 6:
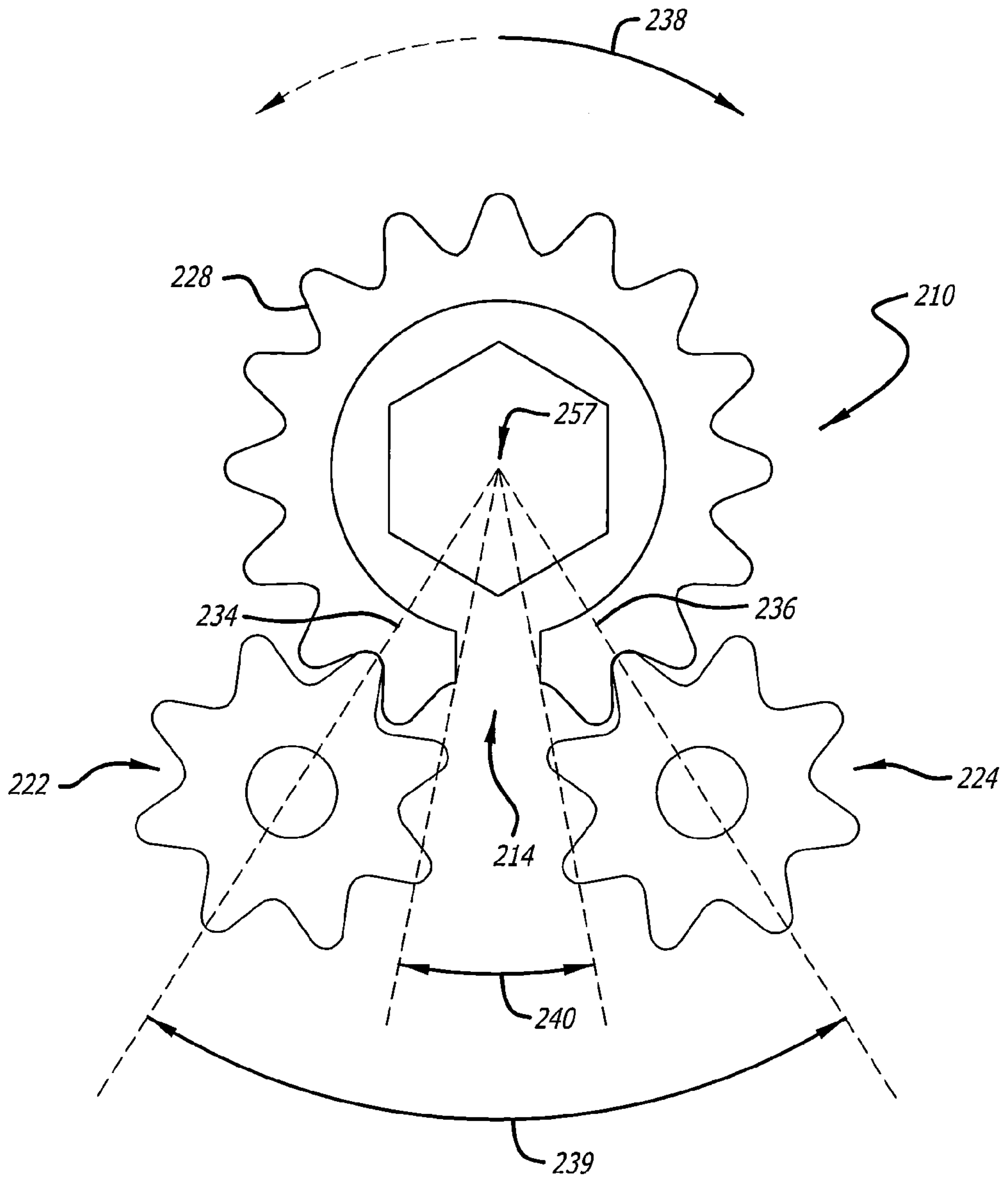

As illustrated in FIG. 6, in one example of the apparatus 200, the first coupling 222 (e.g., the first intermediate gear 222) engages the annular output 210 at a first angular position 234 on the annular output 210, and the second coupling 224 (e.g., the second intermediate gear 224) engages the annular output 210 at a second angular position 236 on the annular output 210.

The first angular position 234 and the second angular position 236 subtend a central angle 239, which is greater than a corresponding central angle 240 subtended by the width of the second slot 214. The central angles 239, 240 include common vertices coincident with a rotational axis 257 of the annular output 210. Responsive to rotation of the annular output 210 in either of two directions, indicated by a bidirectional arrow 238, the second slot 214 periodically comes into alignment with either the first intermediate gear 222 or the second intermediate gear 224, interrupting transmission of torque from one of the first intermediate gear 222 or the second intermediate gear 224 to the output gear 228. Arranging the first intermediate gear 222 and the second intermediate gear 224 in parallel ensures uninterrupted transmission of torque from the input 208 to the annular output 210, as illustrated, e.g., in FIG. 5.

In an example of the apparatus 200, with the annular output 210 not coupled to the input 208 by the first coupling (first intermediate gear) 222 due to alignment of the second slot 214 with the first intermediate gear 222, the annular output 210 is still coupled to the input 208 by the second coupling (second intermediate gear) 224. With the annular output 210 not coupled to the input 208 by the second coupling (second intermediate gear) 224 due to alignment of the second slot 214 with the second intermediate gear 224, the annular output 210 is still coupled to the input 208 by the first coupling (first intermediate gear) 222.

In an example of the apparatus 200, the first coupling 222 and the second coupling 224 collectively transmit a total torque to the annular output 210 from the input 208, the total torque being equal to a sum of a first torque transmitted by the first coupling 222 and a second torque transmitted by the second coupling 224. The second torque equals the total torque when the first torque is zero. Conversely, the first torque equals the total torque when the second torque is zero. Accordingly, uninterrupted transmission of torque from the input 208 to the annular output 210 is thereby provided regardless of the orientation of the second slot 214.

Figure 7:
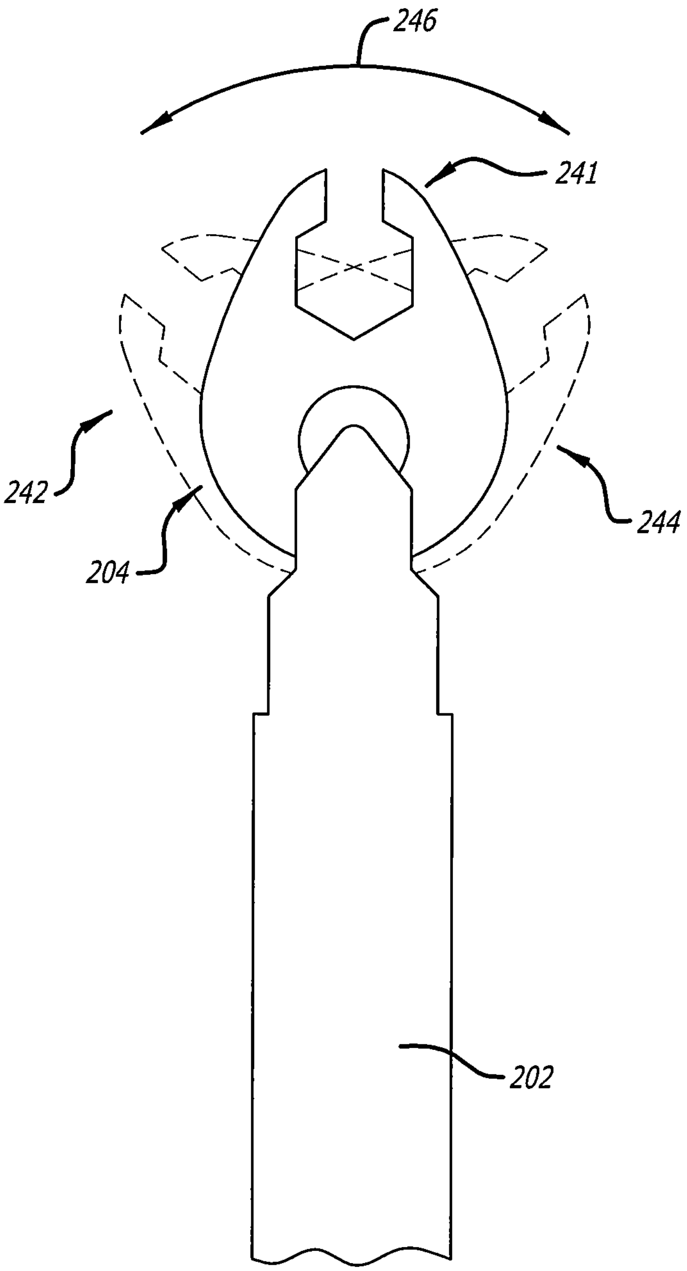

Referring to FIG. 7, in one example, the apparatus 200 is provided with selectable angular orientations of the chassis 204 relative to the drive 202. The chassis 204 is shown in solid lines in one selectable angular orientation 241. The chassis 204 may be moved to other selectable angular orientations, illustrated representatively as 242 and 244, by repositioning the chassis 204 relative to the drive 202, as indicated by a bidirectional arrow 246. From the following description, those skilled in the art will appreciate that additional and/or different angular orientations of the chassis 204 relative to the drive are possible. Selectable angular orientations of the chassis 204 promote improved access to an article (e.g., an article 252, such as a nut or a portion of a turnbuckle, to be described hereinafter) to be rotated or driven by the apparatus 200.

In one example of the apparatus 200, various selectable angular orientations (e.g., 241, 242, and 244) of the chassis 204 relative to the drive 202 are enabled by characteristics of the collar 218. As shown in FIG. 4, the collar 218 is configured to be infinitely angularly adjustable relative to the housing portion 248 of the drive 202 via a clamp 247. The collar 218 includes tabs 243 and 245 and is split therebetween to provide clamping capability. A bolt and a nut (not shown) may be inserted through the tabs 243, 245 to secure the collar 218 to the housing portion 248, for example.

Again referring to FIG. 4, in addition to the infinite angular adjustment of the collar 218 relative to the housing portion 248 of the drive 202 described above, in one example of the apparatus 200, the mating features 220 of the collar 218 provide discrete selectable angular orientations of the chassis relative to the drive, such as the angular orientations 241, 242, 244 (FIG. 6). The engagement feature 216 is male and the mating features 220 are female, such as discrete notches. The mating features 220 are located along an outer surface 250 of the collar 218.

In an example of the apparatus 200, the drive 202 is rotatably coupled to the input 208. Coupling may be accomplished by, for example, a friction fit between a square drive shaft 203 of the drive 202 and a corresponding socket 205 of the input 208. The square drive shaft 203 may be of a conventional type, and may include a ball detent (not shown) for positive engagement with the socket 205, for example.

Figure 8:
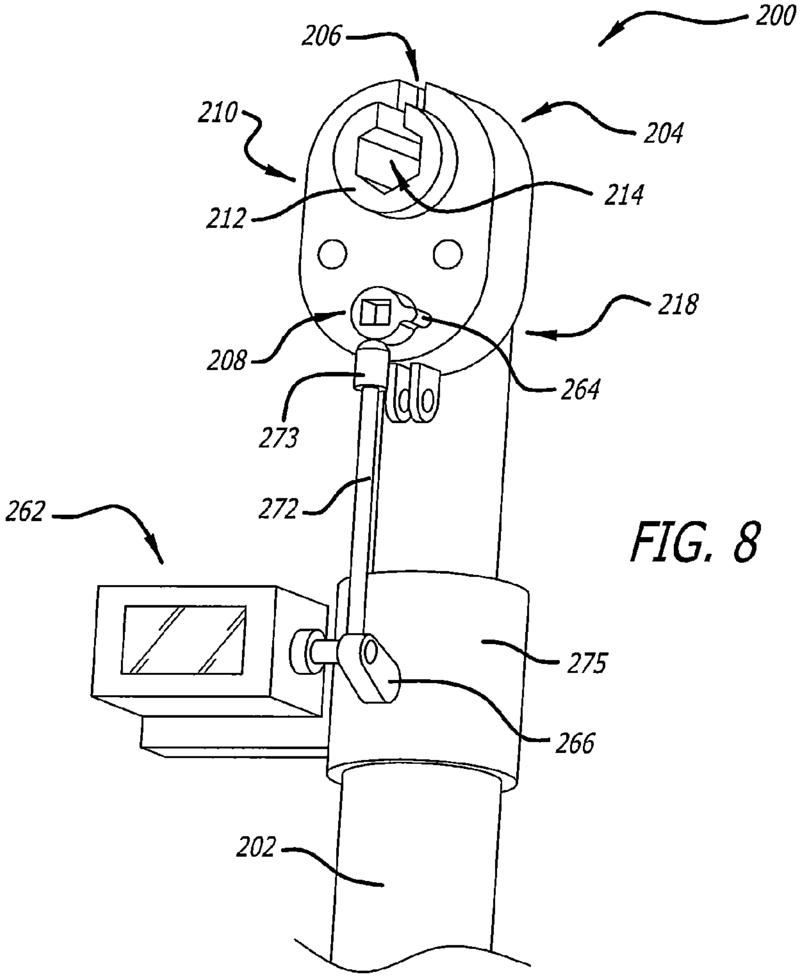

Turning now to FIG. 8, in one example, the apparatus 200 includes a counter 262 to register rotations of the annular output 210. Registering rotations enables an operator, for example, to precisely achieve a required torque setting and/or position of the article 252 or to install a plurality of articles 252 in an identical manner. Accordingly, it is necessary to provide the operator with an indication of a number of rotations required to achieve the desired result. Those skilled in the art will understand this indication to provide a reference value corresponding to, but not necessarily limited to, the actual number of rotations of the annular output 210.

In an example of the apparatus 200, the counter 262 is a mechanical counter. A mechanical counter may satisfy workplace-safety regulations in certain hazardous environments, such as those containing explosive fumes.

In one example of the apparatus 200, the counter 262 is mechanically coupled to one of the input 208 or the annular output 210. Rotatable components, such as the input 208 and the annular output 210, may each provide a source for inputs to the counter 262, as described in further detail below.

Figure 9:
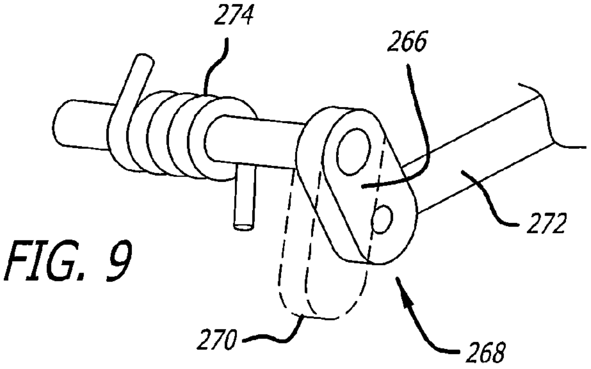

In an example of the apparatus 200, one of the input 208 or the annular output 210 (FIG. 10) also includes a lobe 264. Referring also to FIG. 9, the counter 262 also includes an input element 266, which may be a pivot arm, for example, movable between a first position 268 and a second position 270. The apparatus 200 further includes a linkage 272 to be displaced by the lobe 264 and to move the input element 266 between the first position 268 and the second position 270.

The linkage 272 is a rod movably coupled to the chassis 204 by a boss 273. The counter 262 is attached to the drive 202 by a clamp 275. Other ways of supporting the linkage 272 and the counter 262 may be provided.

In an example of the apparatus 200, the input element 266 is a pivot arm and the counter 262 includes a return spring 274 to urge the input element 266 from the second position 270 to the first position 268. The return spring 274 works in concert with the pivot arm 266, the lobe 264, and the linkage 272 to operate the counter 262.

Figure 10:
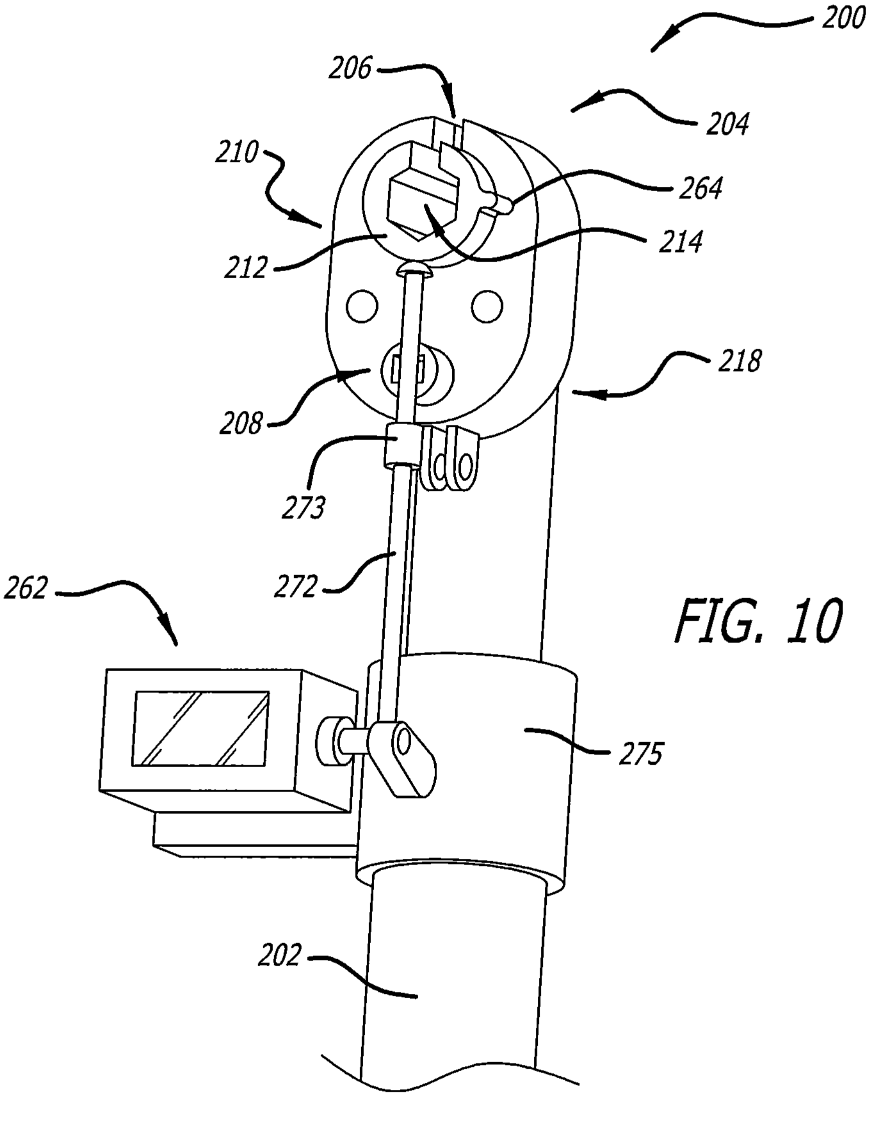

FIG. 10 illustrates an example of the apparatus 200 where the linkage 272 is actuated from the annular output 210, which includes a lobe 264. The input 208 is sufficiently flush with the chassis 204 to provide direct access of the linkage 272 to the annular output 210 and the lobe 264.

An example of the present disclosure relates to a method of rotating a first portion 251 of an article 252 relative to at least one second portion 254, 256 thereof (FIG. 4). In an example of the method, the second portions 254, 256 are coaxial with the first portion 251. The method includes providing the chassis 204 that includes the first slot 206, the input 208 rotatably mounted to the chassis, and an annular output 210 rotatably mounted to the chassis 204. The annular output 210 includes the wall 212 and the second slot 214, extending radially and longitudinally entirely through the wall 212. The method also includes coupling the chassis 204 to the drive 202 in a selectable angular orientation of the chassis 204 relative to the drive 202, and aligning the first slot 206 and the second slot 214. Selecting the angular orientation of the chassis 204 relative to the drive 202 promotes improved access to the article 252. The method also includes passing the second portion 254 or 256 (or, the cables 258 or 260 associated therewith) of the article 252 through the first slot 206 and the second slot 214, to axially align the annular output 210 with the article 252. The method also includes coupling the annular output 210 with the first portion 251 of the article 252, and rotating the annular output 210 to rotate the first portion 251 of the article 252 without rotating the chassis 204. The first portion 251 has a diameter exceeding that of each of the second portions 254, 256.

To rotate the article 252, the annular output 210 includes an interior portion 255 to be coupled to the first portion 251 of the article 252, particularly in tight spaces. The interior portion 255 may be shaped like a socket for engaging, e.g., a hexagonal outer surface 263 of the first portion 251. In the example of FIG. 4, the article 252 is a turnbuckle which connects cables 258, 260. Those skilled in the art will appreciate that the article 252 is not limited to turnbuckles. The article 252 may be, for example, a compression fitting such as a tube nut (not shown), a coupling nut, or may be still other articles.

In one example, the method includes applying a torque to an input 208 rotatably mounted to the chassis 204 and rotatably coupled to the annular output 210.

In one example, the method also includes registering rotations of the annular output 210.

In one example of the method, registering rotations of the annular output 210 includes registering rotations and/or summing of one of the input 208 (FIG. 8) or the annular output 210 (FIG. 10).

As realized herein, a variety of different aspects, examples, and alternatives of the apparatus and methods are disclosed herein that include a variety of components, features, and functionality. It should be understood that the various aspects, examples, and alternatives of the apparatus and methods disclosed herein are capable of including any of the components, features, and functionality of any of the other aspects, examples, and alternatives of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Those skilled in the art will appreciate that the engagement feature 216 and the mating features 220 (FIG. 4) may be modified in various ways. For example, the engagement feature 216 may be removable from the chassis 204 rather than being integral therewith. More specifically, the engagement feature 216 may be a threaded fastener which engages one of a plurality of threaded openings (not shown) in the chassis 204. As described above, the mating features 220 are complementary with the engagement feature 216. Either the mating features 220 or the engagement feature 216 may be male or female. In one aspect, the mating features 220 may be implemented as openings (not shown) mating with the engagement feature 216.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. An apparatus to be operatively coupled to a drive, the apparatus comprising:
- a chassis including a first slot and an engagement feature;
- an input rotatably mounted to the chassis;
- an annular output rotatably mounted to the chassis and rotatably coupled to the input, wherein the annular output includes a wall and a second slot extending radially and longitudinally entirely through the wall, one of the input or the annular output further comprising a lobe;
- a collar configured to engage the drive, wherein the collar comprises a plurality of mating features complementary with the engagement feature;
- a mechanical counter to register rotations of the annular output, the mechanical counter being mechanically coupled to one of the input or the annular output and including an input element movable between a first position and a second position; and
- a linkage to be displaced by the lobe and to move the input element between the first position and the second position.

2. The apparatus of claim 1, wherein the collar is configured to be infinitely angularly adjustable relative to the drive.

3. The apparatus of claim 2, wherein the collar comprises a clamp.

4. The apparatus of claim 2, wherein the collar has an outer surface and the mating features are located along the outer surface.

5. The apparatus of claim 2, wherein the mating features are configured to provide discrete selectable angular orientations of the chassis relative to the drive.

6. The apparatus of claim 1, wherein the engagement feature is male and the mating features are female.

7. The apparatus of claim 1, further comprising a first coupling arranged to transmit a first torque from the input to the annular output, and a second coupling arranged to transmit a second torque from the input to the annular output, wherein the second coupling is in parallel with the first coupling.

8. The apparatus of claim 7, wherein upon the annular output not being coupled to the input by the first coupling, the annular output is coupled to the input by the second coupling, and upon the annular output not being coupled to the input by the second coupling, the annular output is coupled to the input by the first coupling.

9. The apparatus of claim 7, wherein the first coupling is configured to engage the annular output at a first angular position on the annular output, and the second coupling engages the annular output at a second angular position on the annular output.

10. The apparatus of claim 9, wherein:

the first angular position and the second angular position subtend a central angle greater than that subtended by the second slot;

the annular output includes a rotational axis; and the central angle includes an apex coincident with the rotational axis.

11. The apparatus of claim 7, wherein:

the input further includes an input gear;

the annular output further includes an output gear; and the second slot extends radially and longitudinally entirely through the output gear.

12. The apparatus of claim 11, wherein:

the first coupling comprises a first intermediate gear;

the second coupling comprises a second intermediate gear; and the input gear is in mesh with the first intermediate gear and the second intermediate gear.

13. The apparatus of claim 12, wherein:

upon the output gear not being in mesh with the first intermediate gear, the output gear is in mesh with the second intermediate gear; and upon the output gear not being in mesh with the second intermediate gear, the output gear is in mesh with the first intermediate gear.

14. The apparatus of claim 7, wherein:

the first coupling and the second coupling are configured to transmit a total torque to the annular output from the input, the total torque being equal to a sum of the first torque and the second torque; and the second torque equals the total torque when the first torque is zero, and the first torque equals the total torque when the second torque is zero.

15. The apparatus of claim 1, further comprising a drive rotatably coupled to the input.

16. The apparatus of claim 1, wherein the counter includes a return spring configured to urge the input element to the first position.

17. A method of rotating a first portion of an article relative to a second portion thereof, the second portion being generally coaxial with the first portion, and the first portion having a diameter exceeding that of the second portion, the method comprising:

providing:

a chassis that includes a first slot;

an input rotatably mounted to the chassis;

an annular output rotatably mounted to the chassis; the annular output including a wall and a second slot extending radially and longitudinally entirely through the wall, one of the input or the annular output comprising a lobe;

a mechanical counter to register rotations of the annular output, the mechanical counter being mechanically coupled to one of the input or the annular output and including an input element movable between a first position and a second position; and a linkage to be displaced by the lobe and to move the input element between the first position and the second position;

coupling the chassis to a drive in a selectable angular orientation of the chassis relative to the drive;

aligning the first slot with the second slot;

passing the second portion of the article through the first slot and the second slot to axially align the annular output with the article;

coupling the annular output with the first portion of the article; and rotating the annular output to rotate the first portion of the article with respect to the chassis.

18. The method of claim 17, further including applying a torque to the input rotatably coupled to the annular output.

19. The method of claim 17, further comprising registering rotations of the annular output.

20. The method of claim 19, wherein registering rotations of the annular output comprises registering rotations of the input.

* * * * *